H. M. CRAMER.
MOTOR PUMP.
APPLICATION FILED JUNE 28, 1907.
913,701.
Patented Mar. 2, 1909.
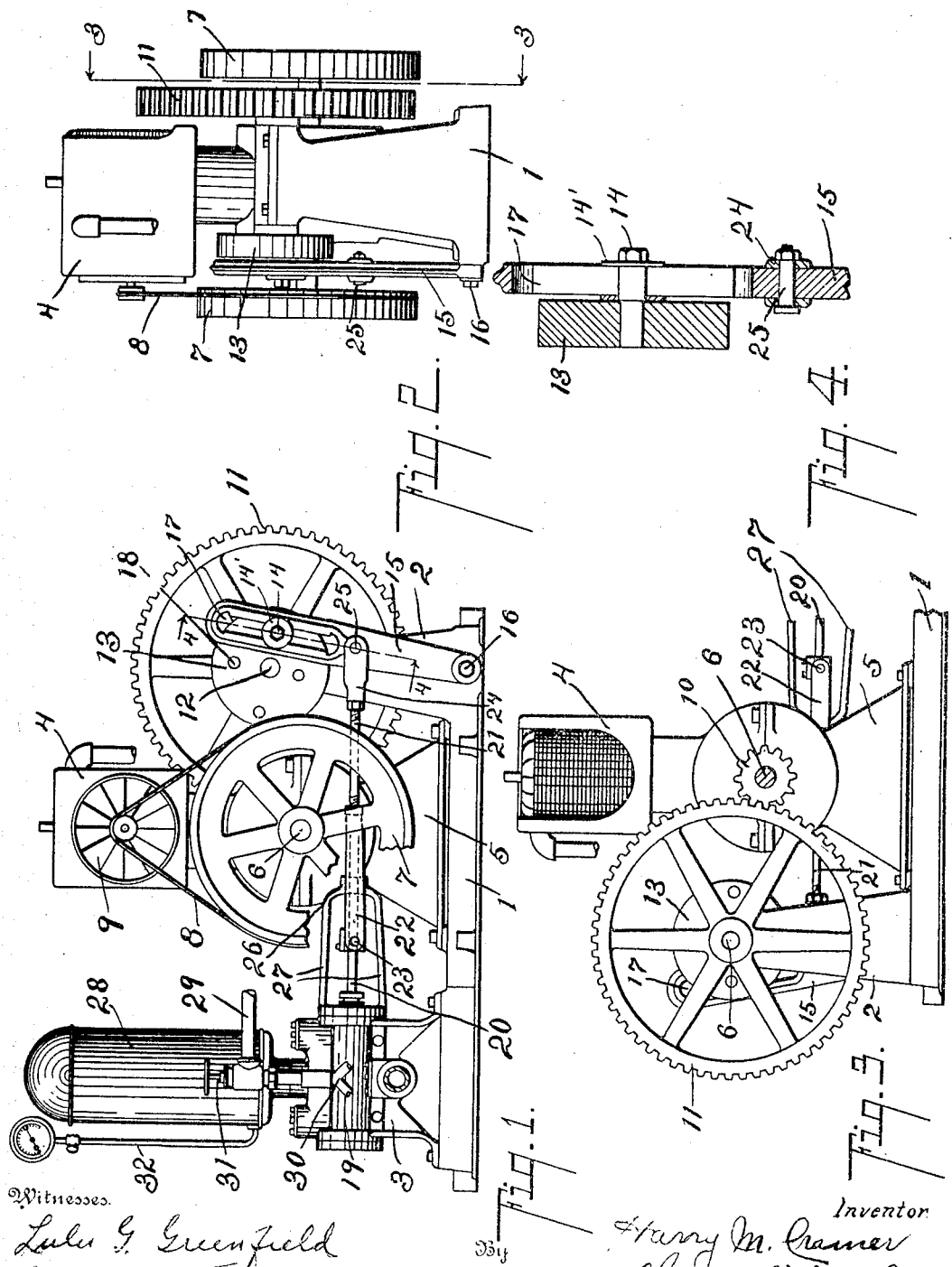
Witnesses.
Lulu G. Greenfield
Gertrude Tallman
Inventor
Harry M. Cramer
Chappell & Earl
Attorneys

UNITED STATES PATENT OFFICE.

HARRY M. CRAMER, OF LANSING, MICHIGAN, ASSIGNOR TO THE "NEW WAY" MOTOR COMPANY, OF LANSING, MICHIGAN.

MOTOR-PUMP.

No. 913,701.  Specification of Letters Patent.  Patented March 2, 1909.

Application filed June 28, 1907. Serial No. 381,297.

*To all whom it may concern:*

Be it known that I, HARRY M. CRAMER, a citizen of the United States, residing at Lansing, county of Ingham, State of Michigan, have invented certain new and useful Improvements in Motor-Pumps, of which the following is a specification.

This invention relates to improvements in motor pumps.

The main object of this invention is to provide an improved motor pump which is compact and durable and at the same time one which is of relatively high power, very simple in structure and durable in use.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a side elevation of a structure embodying the features of my invention; Fig. 2 is an end elevation thereof looking from the right of Fig. 1; Fig. 3 is a detail vertical section taken on a line corresponding to line 3—3 of Fig. 2; and Fig. 4 is an enlarged detail section taken on a line corresponding to line 4—4 of Fig. 1.

In the drawings similar reference characters refer to similar parts throughout the several views, and the sectional views are taken looking in the direction of the little arrows at the ends of the section lines.

Referring to the drawing, the base 1 is provided with a shaft pedestal 2 at one end and with a pump pedestal 3 at the other. The engine 4 is provided with a suitable base 5, which is secured upon the base 1 between the pedestals 2 and 3, as clearly appears from the drawing. The engine shaft 6 is preferably provided with a balance wheel 7 at each end, the balance wheel at one side serving as a belt wheel for the belt 8 by which the fan 9 is driven. On the engine shaft is a pinion 10 arranged to mesh with a pinion 11 on the shaft 12 mounted on the bearing pedestal 2. The shaft 12 is provided with a crank disk 13, the crank pin 14 of which is arranged in the slot 17 in the swinging end of the lever 15, the lever 15 being secured upon the base 1 by a pivot 16. The crank disk 13 is provided with a plurality of holes 18 adapted to receive the crank pin so that the crank pin may be adjusted thereon, thereby varying the stroke of the lever.

The pump 19 is arranged in a horizontal position on the pedestal 3. The piston rod 20 of the pump is connected to the lever preferably by a connecting rod comprising the adjustable section 21, which is threaded into the coupling sections 22 and 24, the coupling section 22 being secured by a pivot 23 to the piston rod and the coupling section being connected by the pivot 25 to the lever 15. The section 21 is threaded into the sections 22 and 24 so that by turning the same the length of the coupling rod may be regulated. The outer end of the piston rod is supported by a bearing 26 carried by the arms 27. The pivot 23 for the coupling rod is secured to the piston rod inside of this bearing so that the piston rod has a straight reciprocatory motion and does not bind in its bearings.

The storage or pressure chamber 28 is suitably connected to the pump and is provided with discharge pipes 29 and 30, which are controlled by a suitable valve as 31. I preferably provide a suitable pressure gage, as 32.

By thus arranging the parts I secure a very compact structure and one which is light and readily portable. While I have particularly designed the same as a force pump for use in spraying or the like where considerable pressure is desired, it is, of course, adapted for use in various other relations, as for the operation of pneumatic machinery, and the like, or as an exhaust pump, when provided with suitable connections.

I have illustrated and described my improvements in detail in the form preferred by me, though I am aware that the structure illustrated and described is capable of considerable variation in structural details without departing from my invention.

Having thus described my invention, what I claim as new and desire to secure by Letters Patent, is:

1. In a portable pumping device, the combination with a portable base having a bearing pedestal at one end thereof and a pump pedestal at the other; an engine mounted on said base between said pump and bearing pedestals; a pump arranged horizontally on said pump pedestal; a shaft arranged on said bearing pedestal; gear connections for said shaft to said engine located at one side of said engine and said bearing pedestal; a crank disk on the said shaft arranged at the other side of said bearing pedestal; a lever having a longitudinal slot in its swinging end pivoted at the side of said bearing pedestal and arranged to extend up at the side of said crank disk; a crank pin on said crank disk arranged in said slot in said lever, said crank pin being adjustably secured to said crank disk; a piston rod for said pump; a bearing for the outer end of said piston rods; supporting arms for said bearing carried by said pump and projecting forwardly therefrom; and a connecting rod pivotally connected to said lever and the said piston rod, said connecting rod and piston rod being arranged between the body of the engine and the fly wheel thereof, on the side opposite to said connection for said engine and shaft, for the purpose specified.

2. In a portable pumping device, the combination with a portable base having a bearing pedestal at one end thereof and a pump pedestal at the other; an engine mounted on said base between said pump and bearing pedestals; a pump arranged horizontally on said pump pedestal; a shaft arranged on said bearing pedestal; gear connections for said shaft to said engine located at one side of said engine and said bearing pedestal; a crank disk on the said shaft arranged at the other side of said bearing pedestal; a lever having a longitudinal slot in its swinging end pivoted at the side of said bearing pedestal and arranged to extend up at the side of said crank disk; a crank pin on said crank disk arranged in said slot in said lever, said crank pin being adjustably secured to said crank disk; a piston rod for said pump; and a connecting rod pivotally connected to said lever and the said piston rod, said connecting rod and piston rod being arranged between the body of the engine and the fly wheel thereof, on the side opposite to said connection for said engine and shaft, for the purpose specified.

3. In a portable pumping device, the combination with a portable base having a bearing pedestal at one end thereof and a pump pedestal at the other; an engine mounted on said base between said pump and bearing pedestals; a pump arranged horizontally on said pump pedestal; a shaft arranged on said bearing pedestal; gear connections for said shaft to said engine located at one side of said engine and said bearing pedestal; a crank disk on the said shaft arranged at the other side of said bearing pedestal; a lever having a longitudinal slot in its swinging end pivoted at the side of said bearing pedestal and arranged to extend up at the side of said crank disk; a crank pin on said crank disk arranged in said slot in said lever; a piston rod for said pump; a bearing for the outer end of said piston rod; supporting arms for said bearing carried by said pump and projecting forwardly therefrom; and a connecting rod pivotally connected to said lever and the said piston rod, said connecting rod and piston rod being arranged between the body of the engine and the fly wheel thereof, on the side opposite to said connection for said engine and shaft, for the purpose specified.

4. In a portable pumping device, the combination with a portable base having a bearing pedestal at one end thereof and a pump pedestal at the other; an engine mounted on said base between said pump and bearing pedestals; a pump arranged horizontally on said pump pedestal; a shaft arranged on said bearing pedestal; gear connections for said shaft to said engine located at one side of said engine and said bearing pedestal; a crank disk on the said shaft arranged at the other side of said bearing pedestal; a lever having a longitudinal slot in its swinging end pivoted at the side of said bearing pedestal and arranged to extend up at the side of said crank disk; a crank pin on said crank disk arranged in said slot in said lever; a piston rod for said pump; and a connecting rod pivotally connected to said lever and the said piston rod, said connecting rod and piston rod being arranged between the body of the engine and the fly wheel thereof, on the side opposite to said connection for said engine and shaft, for the purpose specified.

5. In a portable pumping device, the combination with a portable base having a bearing pedestal at one end thereof and a pump pedestal at the other; an engine mounted on said base between said pump and bearing pedestals; a pump arranged horizontally on said pump pedestal; a shaft arranged on said bearing pedestal; driving connections for said shaft to said engine; a crank disk on the said shaft; a lever having a longitudinal slot in its swinging end pivoted at the side of said bearing pedestal and arranged to extend up at the side of said crank disk; a crank pin on said crank disk arranged in said slot in said lever; a piston rod for said pump; and a connecting rod pivotally connected to said lever and the said piston rod, said connecting rod and piston rod being arranged between the body of the engine and the fly wheel thereof, for the purpose specified.

6. In a portable pumping device, the combination with a portable base; an engine mounted on said base; a pump arranged horizontally on said base at one side of said engine; a shaft arranged on said base at the other side of said engine; driving connections for said shaft to said engine; a crank disk on the said shaft; a lever having a longitudinal slot in its swinging end pivoted at its lower end and arranged to extend up at the side of said crank disk; a crank pin on said crank disk arranged in said slot in said lever; a piston rod for said pump; and a connecting rod pivotally connected to said lever and the said piston rod, said connecting rod and piston rod being arranged between the body of the engine and the fly wheel thereof, for the purpose specified.

7. In a portable pumping device, the combination with a portable base; an engine mounted on said base; a pump arranged horizontally on said base at one side of said engine; a shaft arranged on said base at the other side of said engine; driving connections for said shaft to said engine; a crank disk on the said shaft; a lever having a longitudinal slot in its swinging end pivoted at its lower end and arranged to extend up at the side of said crank disk; a crank pin on said crank disk arranged in said slot in said lever; a piston rod for said pump; and a connecting rod pivotally connected to said lever and the said piston rod, for the purpose specified.

In witness whereof, I have hereunto set my hand and seal in the presence of two witnesses.

HARRY M. CRAMER. [L. S.]

Witnesses:
   E. W. GOODNOW,
   S. B. SPALDING.